UNITED STATES PATENT OFFICE.

HUGO HASSENCAMP, OF ELBERFELD, GERMANY, ASSIGNOR TO THE FARBENFABRIKEN, VORMALS FR. BAYER & CO., OF SAME PLACE.

VIOLET DYE.

SPECIFICATION forming part of Letters Patent No. 501,069, dated July 11, 1893.

Application filed January 19, 1893. Serial No. 458,903. (Specimens.) Patented in France October 27, 1891, No. 217,020, and in England November 4, 1891, No. 19,062.

*To all whom it may concern:*

Be it known that I, HUGO HASSENCAMP, doctor of philosophy, chemist, (assignor to the FARBENFABRIKEN, VORMALS FR. BAYER & Co., of Elberfeld,) a subject of the Emperor of Germany, residing at Elberfeld, Germany, have invented a new and useful Improvement in the Manufacture of Coloring-Matters Belonging to the Series of Triphenylmethan Dye-Stuffs, (for which the aforesaid FARBENFABRIKEN has already obtained Letters Patent in France, No. 217,020, dated October 27, 1891, and in England, No. 19,062, dated November 4, 1891,) of which the following is a specification.

My invention relates to the production of a new bluish violet triphenylmethan dye-stuff by condensing equimolecular proportions of tetramethyldiamidobenzhydrol and ethylbenzylanilin disulfo acid of the following composition:

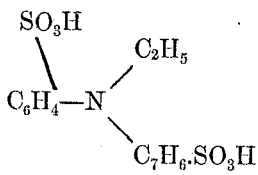

oxidizing the thus produced leuco product of the formula

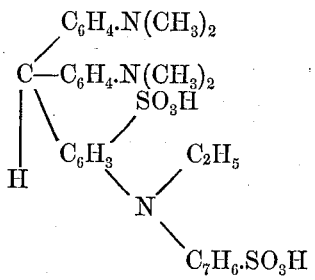

and converting the so formed oxidation product into the sodium salt having the following formula:

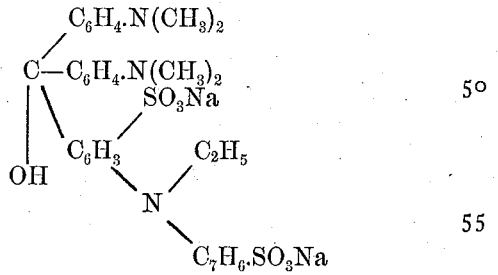

In carrying out my process practically I proceed as follows: I prepare ethylbenzylanilin disulfo acid, for instance, by introducing ethylbenzylanilin into four times its weight of fuming sulfuric acid (containing forty per cent. of sulfuric anhydrid) and heating the liquid mixture at from 55° to 60° centigrade for about two or three days. The mixture after cooling is poured on ice and the formed ethylbenzylanilin disulfo acid is isolated in the usual manner by conversion into the calcium salt. This ethylbenzylanilin disulfo acid differs from the known ethylbenzylanilin monosulfo acid by containing one sulfo group in the benzyl group and the second sulfo group in the phenyl group. It possesses the aforesaid composition 4.15 kilos, by weight, of the sodium salt of ethylbenzylanilin disulfo acid are dissolved in water, and this liquid is mixed with a solution in water of the sulfuric salt of tetramethyldiamidobenzhydrol obtained by dissolving 2.7 kilos, by weight, of tetramethyldiamidobenzhydrol in about forty kilos, by weight, of sulfuric acid (containing five per cent. of pure acid). The resulting liquid is then heated on the water bath, until the reaction is completed and the tetramethyldiamidobenzhydrol is condensed with the ethylbenzylanilin disulfo acid, water being separated from both components and the above defined leuco product being formed in this reaction. After neutralizing with sodium carbonate, the sodium salt of the above named leuco product, which represents a disulfo acid, is precipitated by means of sodium sulfate. In order to oxidize, it is dissolved in twenty kilos, by weight, of acetic acid (containing fifty per cent. of pure acid), and on stirring 4.8 kilos, by weight, of a lead dioxid paste (containing fifty per cent. of lead dioxid) are added. In a short time the oxidation is complete. After adding sodium sulfate, in order to decompose the lead compounds dissolved, and filtering off the so formed lead sulfate, the resulting filtrate is mixed with sodium sulfate; in this manner the complete dye-stuff is precipitated, which is then filtered off, pressed and dried. It corresponds to the formula:

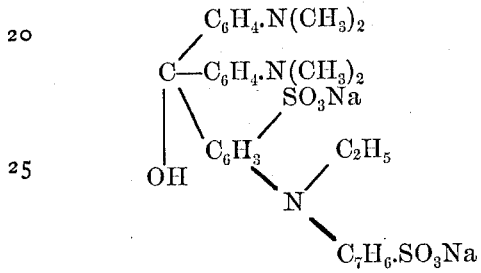

and forms a dark mass of brilliant copper-like luster and with cantharis-like luster on the fracture. After pulverizing it is a brownish-black powder. It is easily soluble in water with deep blue color, and somewhat soluble in alcohol with the same color. It dissolves in ammonia and sodium carbonate with pure blue color which is not altered on heating. In soda-lye it dissolves with dull blue color which becomes on heating deep ruby-colored. On adding acetic acid to the thus resulting solution in soda-lye a dull violet color appears. It dissolves in diluted hydrochloric acid with brownish-yellow color which turns into green on the addition of water. By diluted sulfuric acid it is dissolved with green color, which is not altered by adding water, a precipitate being also not separated. When its watery solutions are mixed with ammonia or sodium carbonate, the color is not altered, even on heating. On adding soda-lye to its solutions in water a change in color does not take place at ordinary temperature, while on heating these alkaline solutions assume a ruby-red color which becomes dull-violet, if acetic acid be added. When its watery solutions are mixed with diluted hydrochloric acid, a green color results which turns into greenish-yellow, if a great excess of hydrochloric acid be added. On the addition of diluted sulfuric acid to its solutions in water the latter assume a green color which is not altered by employing a great excess of sulfuric acid. It is adapted for dyeing wool in acid baths. The resulting shades are violet with a strong bluish tinge and are similar to those produced by cotton-blue R. The colors do not change their shades in the artificial light, though all known violet dye-stuffs of the rosaniline series do so. They are fast against the action of fulling and possess such a great fastness against the action of alkalies that the fiber dyed with the new product is not discolored by caustic lime or concentrated ammonia.

Having thus described my invention and in what manner it can be performed, that which I claim as new, and desire to secure by Letters Patent, is—

1. The process for producing a new triphenylmethan dye-stuff by combining equimolecular proportions for tetramethyldiamidobenzhydrol and ethylbenzylanilin disulfo acid or a salt thereof, oxidizing the resulting leuco compound and converting the oxidation product into the sodium salt.

2. As a new product the triphenylmethan dye-stuff having the following formula:

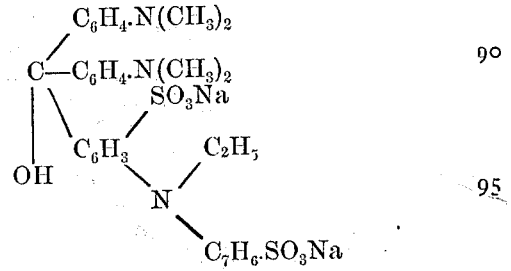

forming a brownish-black powder, soluble in water, in ammonia, and sodium carbonate, slightly soluble in alcohol with blue color, soluble in soda lye with dull blue color, changing on heating into ruby red, and forming a dull violet on addition of acetic acid, soluble in dilute hydrochloric acid with brownish-yellow color, turning into green on addition of water, soluble in dilute sulfuric acid with green color; dyeing wool in an acid bath violet, with a strong bluish tinge; which color is fast to lime and ammonia and does not appear changed by artificial light, and has the qualities substantially as specified.

In testimony whereof I have signed my name in the presence of two subscribing witnesses.

HUGO HASSENCAMP.

Witnesses:
 WM. ESSENWEIN,
 RUDOLPH FRICKE.